G. ESTERLY.
Improvement in Harvesters.
No. 5,115.
Reissued Oct. 29, 1872.
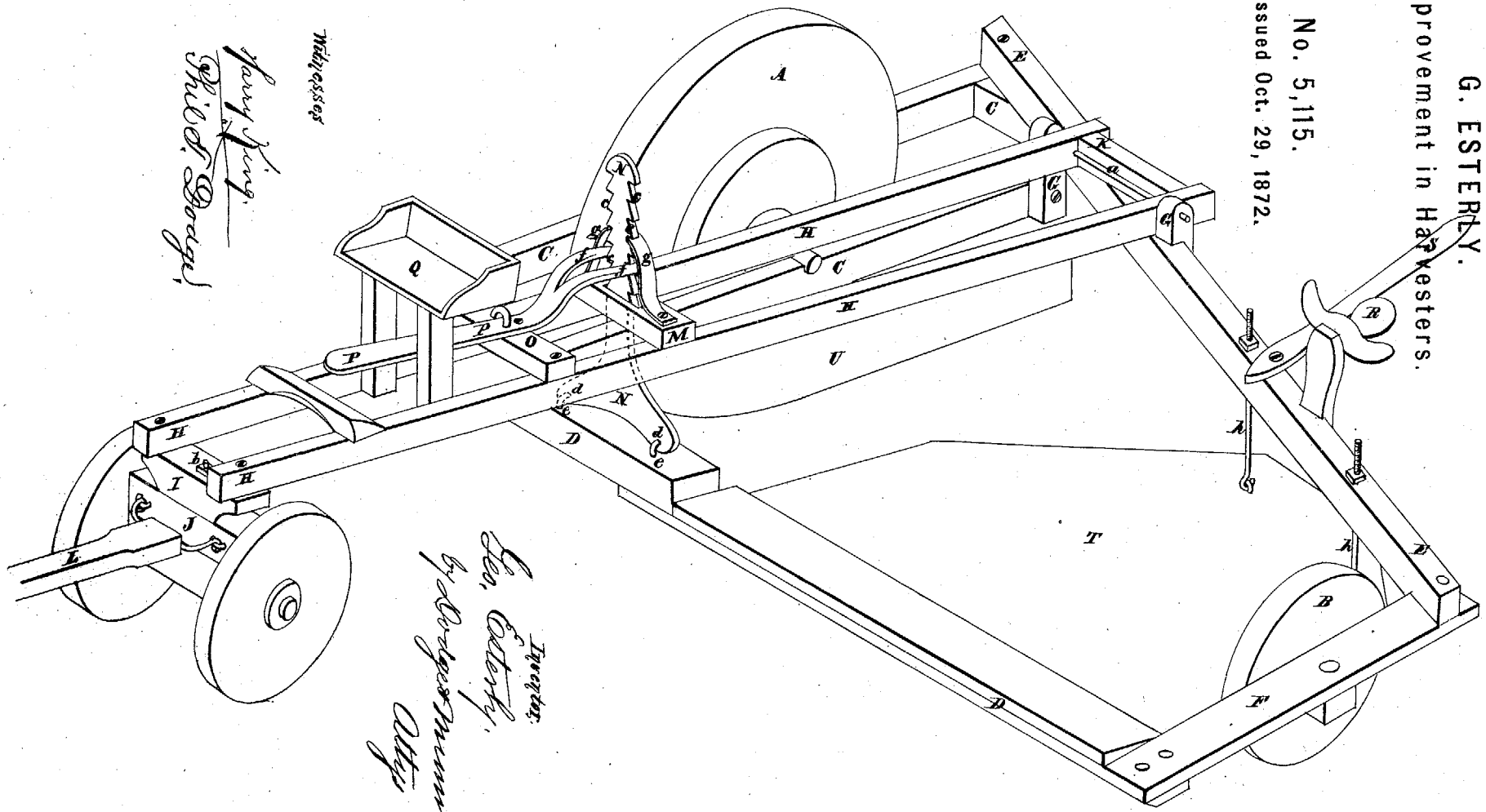
Inventor,
Geo. Esterly,
by Dodger & Munn
Attys
Witnesses
Harry King.
Phil T. Dodge,

UNITED STATES PATENT OFFICE.

GEORGE ESTERLY, OF WHITEWATER, WISCONSIN.

IMPROVEMENT IN HARVESTERS.

Specification forming part of Letters Patent No. 16,873, dated March 24, 1857; extended seven years; reissue No. 5,115, dated October 29, 1872.

*To all whom it may concern:*

Be it known that I, GEORGE ESTERLY, formerly of Hart Prairie, now of Whitewater, in the county of Walworth and State of Wisconsin, have invented certain new and useful Improvements in Harvesters; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention relates to machines for cutting grain or grass; and the invention consists in so hinging the draft-bar to the main frame of the machine in rear of the axle, and at or near the rear end of the frame, that force applied to the draft-bar in a backward direction will tend to raise the cutter-bar or front of the main frame from the ground, and in a method of connecting the main frame to the draft-bar, as hereinafter explained.

The drawing is a perspective view of a machine embodying my improvements.

A represents the main driving and supporting wheel of the machine, and B the outside supporting-wheel. The wheel A has its bearing in a rectangular frame, C, from which extends laterally the cutter-beam D, and a rear beam, E, which are united at their outer ends by a girt, F, to which the outer wheel B is attached. On the rear beam E or near to it are arranged two supports, G, to which is pivoted the rear end of the reach or draft-bar H, the front end being provided with a bolster, I, and resting on a truck, J, to which it is pivoted, so that the wheels may turn freely under the reach. The tongue L may be loose and thus the horses' necks will be relieved of weight. A bar, M, is secured upon the reach at or near its center, through a mortise in which there extends up a forked bar, N, hinged at its lower end to the cutter-bar, D, and having ratchet-teeth *c* on its opposite edges, as shown in the drawing. Another bar, O, is attached to the reach in front of the bar M, and has pivoted on it a lever, P, the front end of which passes under the driver's seat Q so as to be conveniently reached by the driver, while its rear end is forked so as to straddle the shank of the supporting-bar N. The edges of the prongs *f* of this forked portion are beveled or rounded off next to the bar N to prevent their catching in the teeth *c*. Outside of the prongs *f*, and attached to the bar M, are two spring-dogs, *g*, which engage with the teeth of the support N to hold up the cutter-beam or front of the main frame at any fixed height desired. When it is desired to lower the cutter-bar, the driver places his foot on the front end of lever P and pressing it down raises the opposite end, thereby bringing the prongs *f* up against the spring-dogs *g*, throwing them out of the teeth *c*, when the front or cutter bar will drop. By releasing the lever P the dogs *g* will again catch in the teeth and hold the frame suspended, as before. On the rear beam E, and near the raker's seat R, is secured a lever, S, by which the raker can raise the front of the machine at will, the spring-dogs *g* catching in the teeth *c* and holding it up. The elasticity of the spring-dogs *g* is sufficient to allow them to yield a little when the weight of the frame bears on them, thus preventing any sudden shock or jar; and, in order that the raker at his seat may do both the raising and lowering of the cutter-bar, a cord may run from the front end of the lever P over suitable pulleys to or near the raker's seat, so that by drawing on the cord the dogs may be released and the front of the machine be allowed to drop, as before stated. The spreading of the reach or draft-bar and hinging it at the rear of the machine, not only facilitates the turning around of the machine, but prevents all racking of the frame. Besides this, the supporting-bar N, spreading laterally at its lower end where it is connected to the cutter-bar, helps to brace the parts and tends to throw the weight of the machine onto the main wheel A and thus assist to counteract side draft. The reach or draft-bar is placed inside of the main wheel A, or between it and the outer end of the platform or cutter-bar, so as to support as much of the outer part of the machine as possible without interfering with the cutting of the standing grain. The platform T is hinged at its front to the cutter-bar D, and is connected at its rear to the beam E by screwrods *h*, by which it can be raised or lowered, as desired. The raker's seat is also made adjustable on the beam E, so that as the platform is raised or lowered the seat can be adjusted to correspond, the raker's feet resting on the platform. A dash-board, U, is arranged to depend from the frame C on the side next the platform, as represented in the drawing. When sufficient grain has accumulated on the platform to form a gavel it is turned so as to bring the heads of the grain toward the dash-board, when it is pushed off endwise, the heads of the grain striking against the board U, when it falls at once to the ground in a compact bundle convenient for binding.

By hinging the draft-bar to the main-frame at or near the rear end, as shown, and in rear of the axle or supporting-wheel, it will be seen that when the team is backed the front of the machine will have a tendency to be raised from the ground, and that when the team moves forward the front will be held down and made to follow the undulations of the surface, when not held up by the dogs *g*, and thus it may be used either as a loose or rigid frame at will, the former being best adapted for mowing, and the latter for cutting grain.

I am aware that it has been proposed to construct a reaper having its draft-bar pivoted to the main frame slightly in rear of the journal of the bearing-wheel, and in which a lever is pivoted to standards attached to the front of the rear frame, and in which the cutter-bar is elevated by means of said lever; and, therefore, I do not claim such; but Having described my invention, what I claim is—

1. A reaper having its main frame C mounted so as to tip or swing on its bearing-wheels, and having its draft-bar hinged or pivoted to said frame at or near its rear end, substantially as described, whereby the team in backing the machine will raise the cutter-bar from the ground, as set forth.

2. A harvester having its leading truck connected to the main frame by means of a rigid reach or secondary frame, when said reach or frame is pivoted to the main frame at or near its rear end and arranged in relation to the driving-wheel and main frame, substantially as described.

GEO. ESTERLY.

Witnesses:
EDWARD P. BURROWS,
J. H. PAGE.